United States Patent [19]

Nishizawa et al.

[11] Patent Number: 5,078,947
[45] Date of Patent: Jan. 7, 1992

[54] METHOD AND APPARATUS FOR THE FABRICATION OF OPTICAL RECORD MEDIA SUCH AS A DIGITAL AUDIO DISC

[75] Inventors: Akira Nishizawa; Tetsuya Kondo, both of Yokohama, Japan

[73] Assignee: Victor Company of Japan, Ltd., Yokohama, Japan

[21] Appl. No.: 414,145

[22] Filed: Sep. 28, 1989

[30] Foreign Application Priority Data

Sep. 30, 1988 [JP] Japan .................. 63-248096

[51] Int. Cl.$^5$ ............................. B29C 59/02
[52] U.S. Cl. ......................... 264/1.1; 264/22; 264/101; 264/107; 264/293; 425/174.4; 425/405.1; 425/810
[58] Field of Search .............. 264/22, 107, 106, 101, 264/1.3, 1.1, 293; 425/810, 174.4, 405.1

[56] References Cited

U.S. PATENT DOCUMENTS

| | | | |
|---|---|---|---|
| 4,157,931 | 6/1979 | Bricot et al. | 264/106 |
| 4,312,823 | 1/1982 | Kraakman et al. | 425/405.1 |
| 4,395,211 | 7/1983 | Broeksma et al. | 425/405.1 |
| 4,472,124 | 9/1984 | Kashihara et al. | 264/107 |
| 4,477,328 | 10/1984 | Broeksma et al. | 264/22 |
| 4,500,484 | 2/1985 | Gregg | 425/810 |
| 4,619,804 | 10/1986 | Leonard et al. | 264/22 |
| 4,788,015 | 11/1988 | Sakai et al. | 264/22 |
| 4,845,000 | 7/1989 | Takeoka et al. | 264/22 |
| 4,933,123 | 6/1990 | Yoshida et al. | 264/22 |
| 4,965,118 | 10/1990 | Kodera et al. | 264/106 |

FOREIGN PATENT DOCUMENTS

| | | | |
|---|---|---|---|
| 0122141 | 6/1985 | Japan | 264/107 |
| 0182532 | 9/1985 | Japan | 264/107 |

OTHER PUBLICATIONS

"Why Extrusion will Challenge Injection Molding for Manufacturing Optical Discs", Plastics Tech., 11/87, pp. 13-17.

Primary Examiner—Willard E. Hoag
Attorney, Agent, or Firm—Fleit, Jacobson, Cohn, Price, Holman & Stern

[57] ABSTRACT

A novel optodynamic method and apparatus for the manufacture of an optical record medium of the type having a multiplicity of pits or like optically detectable marks representative of digitized information to be reproduced wherein a stamper is provided which is of quartz glass or like material that transmits ultraviolet radiation and which has a stamping surface shaped as a negative of the optically detectable marks to be created, the stamping surface is pressed against a blank sheet of polycarbonate or like plastic that absorbs ultraviolet radiation the surfaces of blank sheet is irradiated with ultraviolet light through the stamper whereby the surface of the blank sheet gels, or softens, to permit the optically detectable marks to be impressed thereon. The stamping may be dome in a partial vacuum in order to assure closer contact between the stamper and the blank sheet.

6 Claims, 3 Drawing Sheets

METHOD AND APPARATUS FOR THE FABRICATION OF OPTICAL RECORD MEDIA SUCH AS A DIGITAL AUDIO DISC

BACKGROUND OF THE INVENTION

This invention relates to the manufacture of optical record media, and more specifically to a novel method of, and an apparatus for, making optical record media by utilizing radiant energy in the wavelength of ultraviolet. An example of record media to be fabricated by the invention is a digital audio disc which has a plastic baseplate or substrate having formed thereon a multiplicity of optically detectable marks of infinitesimal dimensions, such as depressions (pits) or projections, in a pattern representative of digitized information to be reproduce.

Digital audio discs, typically including what are known as compact discs (CDs) in common parlance, have won extensive commercial acceptance as record media of music and other information. Usually, the digital audio disc is a lamination of a transparent baseplate, a reflective layer and a protective overlay. The baseplate, molded from a transparent plastic such as polycarbonate, has a multiplicity of pits formed in one surface thereof in a multiturn spiral pattern. The reflective layer is formed on the pit-bearing surface of the substrate, as by vapor deposition of aluminum, and is covered by the protective overlay of a suitable plastic. The pit pattern is read by a laser beam impinging on the disk through the blank surface of the baseplate.

Conventionally, the baseplate with the pits has been formed by injection molding of polycarbonate or like plastic into dies defining a cavity in the shape of the disc-like substrate with the pattern of pits in one side thereof.

This conventional method is undesirable, first of all, because of large-size, high-power injection molding machines required for forming accurately the minute dimensions of the pits, even though the substrate itself to be molded is relatively small in size. The injection molding machines have also been undependable as to their capability of creating the pits to close dimensional tolerances required.

The dimensional accuracy of the pits is closely related to the inherent properties of the plastic employed as a material of the baseplate. Since the baseplate is semirigid, its warping affects the dimensional accuracy of the pits. The melting temperature of the plastic in use must also be taken into consideration in light of the warping of the resulting baseplate. Various proposals have so far been made for the solution of such problems arising from the conventional injection molding method. As far as the applicant is aware, none of them has gained general acceptance in the industry.

Like other forms of record media, optical discs are being constantly improved for greater storage capacities and greater storage densities (storage capacity per unit effective surface area or volume). The noted shortcomings of the conventional injection molding method would become all the more pronounced if it were used for the manufacture of flexible optical record media with a thickness of, say, 0.1 millimeter.

SUMMARY OF THE INVENTION

In view of the state of the art set forth above, the present invention hereby proposes to utilize ultraviolet radiation for fabricating optical record media with a higher degree of precision, and by simpler, less expensive and, above all, far less energy-consuming means, than heretofore.

Briefly stated in one aspect thereof, the invention concerns a method of fabricating a digital audio disc or like optical record medium which has a multiplicity of optically detectable marks such as depressions or projections formed thereon in a prescribed pattern representative of information to be reproduced. The method involves the use of a stamper which is fabricated from a material that transmits ultraviolet radiation and which has a stamping surface on which a multiplicity of marks are formed as a negative of the optically detectable marks to be created in the record medium. The blank on which the optically detectable marks are to be formed is a sheet of a plastic that absorbs ultraviolet radiation. Held against the stamping surface of the stamper under pressure, this plastic sheet blank is irradiated with ultraviolet radiation through the stamper. As the surface of the plastic sheet being held against the stamping surface of the stamper gels, or softens, on irradiation by the ultraviolet radiation, the negative marks on the stamping surface can be accurately impressed, or embossed thereon as the optically detectable marks.

Another aspect of the invention deals with an apparatus for use in carrying out the above summarized method. In its simplest form, the apparatus is required to include only the stamper of a material that transmits ultraviolet radiation, means for pressing at least either of the stamper and the plastic sheet blank of a material that absorbs ultraviolet radiation, and a source of ultraviolet radiation to be positioned behind the stamper. The apparatus is readily adaptable for continuous, quantity production of optical record media, as will be disclosed herein.

The invention is based upon the fact that, essentially, it is only heat that is required for plastic molding. As a source of such heat the invention utilizes ultraviolet radiation, in combination with a stamper that transmits such radiation and a plastic sheet blank that absorbs such radiation. Since the optically detectable marks are formed mostly by the heat generated at the surface of the plastic blank by ultraviolet rays, the pressure under which the stamper and the blank are to be held against each other can be far less than that required by the conventional injection molding method.

Plastics have been known which solidify on exposure to ultraviolet light. The chemical reaction of such plastics to ultraviolet light is completely different from the principles of this invention, which utilizes the heat emitted by some ultraviolet absorbers. The great majority of engineering plastics in current use are aromatic in their molecular structures. The invention has been made by taking advantage of the great capability of such aromatic substances to absorb radiant energy in the wavelength of ultraviolet.

Generally, the shorter the wavelength of light, the greater is the energy per photon. Visible light rays have therefore greater energy than do infrared rays, and ultraviolet rays have greater energy than do visible rays. The radiation in the short wavelength range has still greater energy. However, radiation with a wavelength of less than 190 nanometers can be absorbed by the oxygen contained in air and so will not serve the purposes of the invention. Ultraviolet radiation in a wavelength range of 200-300 nanometers is recommended since its energy is still sufficiently high for the purposes of the invention.

BRIEF DESCRIPTION OF THE DRAWINGS

The above and other features and advantages of this invention will become more apparent, and the invention itself will best be understood, from a study of the following description and appended claims, with reference to the accompanying drawings wherein:

DETAILED DESCRIPTION OF THE PREFERRED EMBODIMENTS

Figure 1:
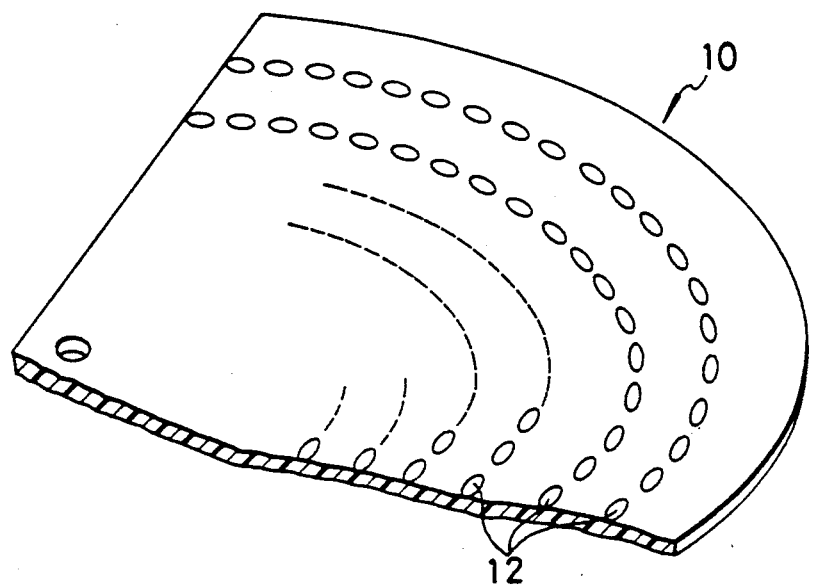
FIG. 1 is a fragmentary perspective view of the known digital audio disc to be fabricated by the invention.
Figure 2:
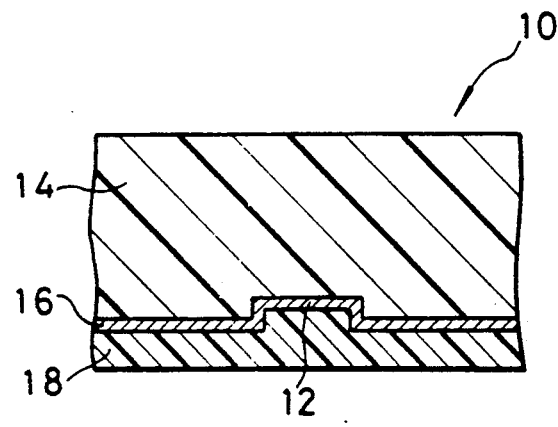
FIG. 2 is an enlarged, fragmentary cross-sectional view through the digital audio disc of FIG. 1.

The invention will now be described in detail as adapted for the manufacture of a digital audio disc, per se well known in the art, which is illustrated fragmentarily in FIG. 1 and in greatly enlarged cross-section in FIG. 2. Generally designated 10, the digital audio disc has a multiplicity of pits 12 arranged in a multiturn spiral to represent the digitized information to be reproduced. The digital audio disc 10 is a laminar construction of a baseplate 14 having the pits 12 formed in one side thereof, an optically reflective layer 16 formed on that side of the baseplate as by vapor deposition of aluminum, and a protective overlay 18. The present invention is specifically directed to the fabrication of the baseplate 14 with the pits 12. The reflective layer 16 and overlay 18 may be formed as required by any known or suitable method.

Figure 3:
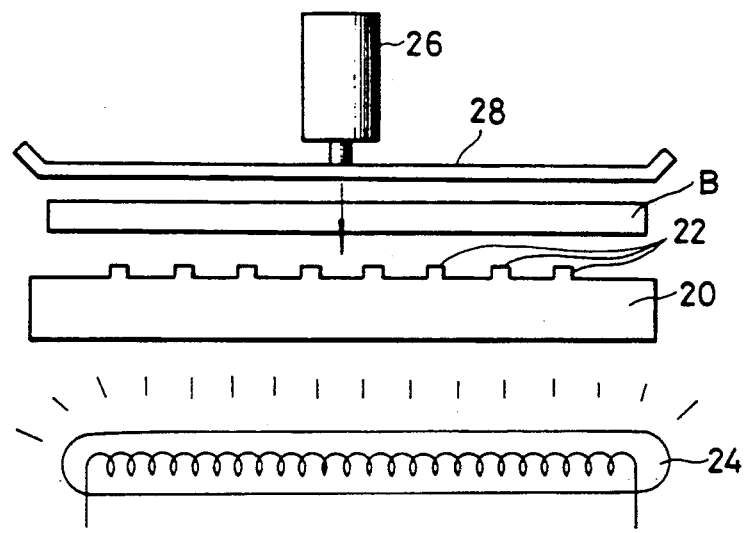
FIG. 3 is a diagrammatic elevational view showing how the digital audio disc is fabricated by the method of this invention.

The fundamental principles of the invention will become apparent from a consideration of FIG. 3. At B is shown a blank in the form of a disc on which pits 12 are to be created and which is thus to become the baseplate 14 of the digital audio disc 10. The blank B must be of a transparent plastic that absorbs ultraviolet radiation and which should therefore be aromatic in composition. Also, the plastic material should rapidly decrease in Young's modulus when it is heated to a temperature just above its softening point as a result of the absorption of ultraviolet radiation. Substances meeting these requirements include polycarbonate and polyether imide resin. Polymethyl methacrylate and polyethylene terephthalate are not recommended.

Seen under the blank B is a stamper 20 having formed thereon a multiplicity of minute projections 22 as a negative of the pits 12 to be formed in the blank. The stamper 20 must be made of a substance that transmits, i.e. is transparent to, ultraviolet radiation as much as possible and which does not adhere to the plastic of which the blank B is made. Quartz glass and polyethylene are among the preferred materials of the stamper 20.

Figure 4:
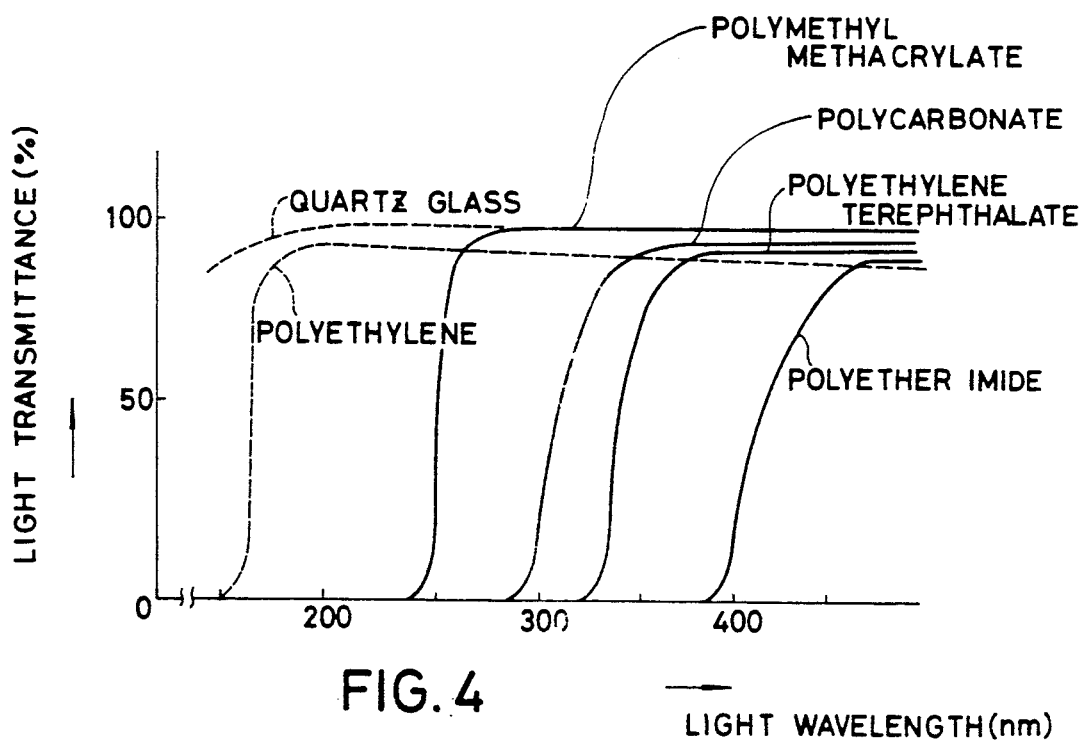
FIG. 4 is a graph plotting the curves of the light transmittance of some pertinent substances against the wavelength of light.

FIG. 4 graphically indicates, by way of reference, the light transmittance of the above listed substances against the wavelength of light. The light transmittance is given in percentage, and the light wavelength in nanometers.

FIG. 3 also shows a lamp or like source 24 of ultraviolet radiation underlying the stamper 20. The ultraviolet light source 24 is to irradiate the blank B via the stamper 20.

For creating pits in the surface of the blank B by the method of this invention, the ultraviolet light source 24 may be lit up after placing the blank on the stamper 20. The ultraviolet radiation will irradiate the surface of the blank B without having been hardly attenuated by the stamper 20 of quartz glass or like substance. The blank B of polycarbonate or polyether imide will nearly completely absorb the ultraviolet energy at its surface, so that the blank surface will gel, or soften. The blank B and the stamper 20 are both of materials that conduct much less heat than metals. Accordingly, most of the heat that has developed at the blank surface will serve the desired purpose of increasing the temperature of the blank surface.

Then, with the ultraviolet light source 24 held glowing, the blank B and the stamper 20 may be pressed against each other. FIG. 3 shows a fluid-actuated cylinder 26 having its piston rod coupled to a pressure pad 28 for pressing the blank B against the stamper 20, which is assumed to be immovably supported. However, alternatively, the stamper 20 may be pressed against the fixed blank B, or both blank and stamper may be moved into forced contact with each other.

Upon pressing of blank B and stamper 20 against each other in either way, the minute projections 22 of the stamper will create pits in the blank surface which is in the state of a gel, or softened as aforesaid. The successful optodynamic stamping of the pits in the blank surface in accordance with the invention depends, of course, on the interaction of such conditions as the pressure under which the blank and the stamper are held against each other, the time of exertion of such pressure, the intensity of the ultraviolet light emitted by the source 24, and the time of ultraviolet irradiation.

Then the ultraviolet light source 24 may be turned off. The blank surface will rapidly cool by virtue of the relatively large heat capacities of the remaining part of the blank B and of the stamper 20 in contact therewith. The blank B and the stamper 20 will therefore become separable from each other very shortly after the ultraviolet light source 24 has been turned off.

Advantageously, the blank B to be processed as above described can be either flexible (e.g. 0.1 millimeter thick) or inflexible (e.g. one to two millimeters thick). The above listed stamping conditions may be suitably determined to suit the thickness of the blank to be processed and the depth of the pits to be created therein. It will also be apparent that the blank can be either circular or noncircular (e.g. rectangular). As an additional advantage, the invention permits the simultaneous creation of pits in both sides of the blank by providing two stampers and two ultraviolet light sources on its opposite sides.

Figure 5:
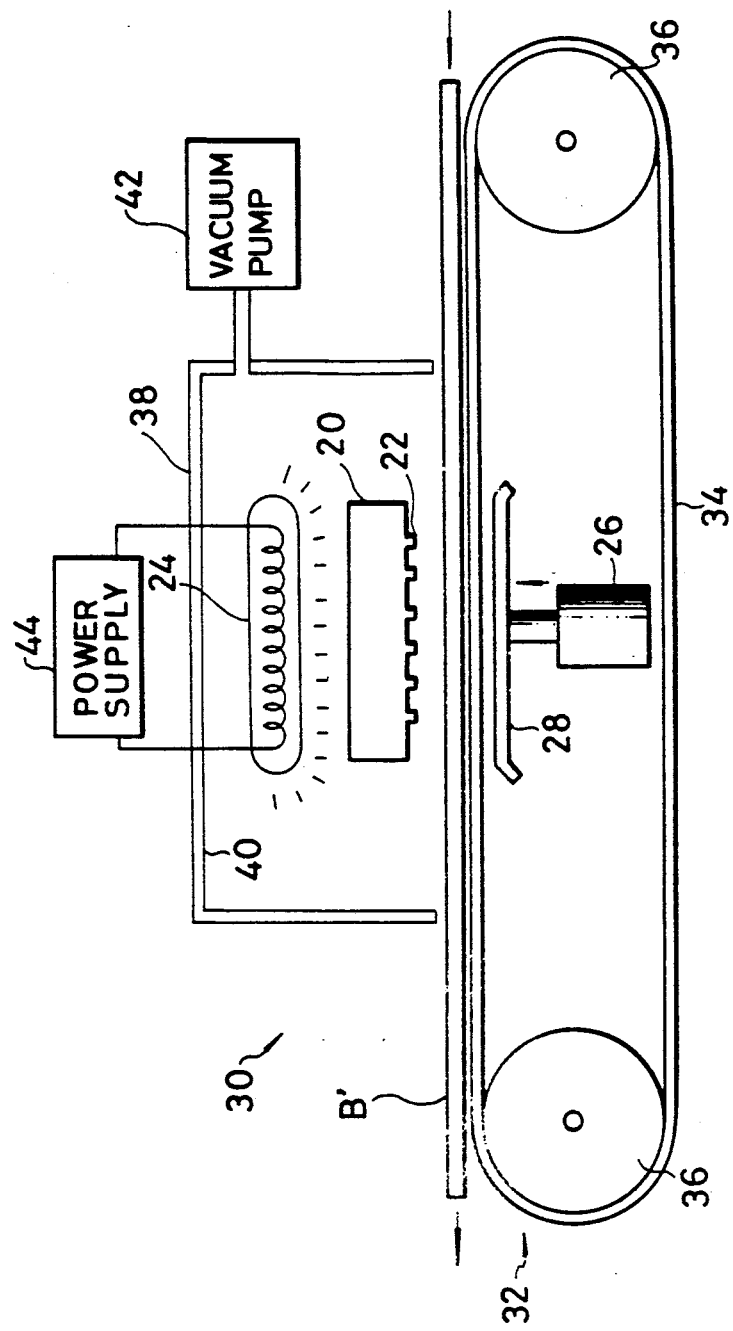
FIG. 5 is a diagrammatic elevational view of an apparatus constructed on the principles of FIG. 3 for the continuous production of digital audio discs.

FIG. 5 diagrammatically illustrates a continuous optodynamic stamping apparatus 30 constructed on the principles of FIG. 3 for the mass production of optical record media. This stamping apparatus 30 is for use with a blank B' in the form of a continuous web of polycarbonate, polyether imide resin, or like substance that meets the requirements set forth previously. The blank web B' is fed longitudinally over a suitable flexible conveyor herein shown as a belt conveyor 32 comprising an endless flexible belt 34 running over a pair of pulleys 36.

Disposed over the belt conveyor 32 is an enclosure 38 defining a substantially hermetically sealed vacuum chamber 40 in communication with a vacuum pump 42. The vacuum chamber 40 is open to part of the blank web B' traveling over the belt conveyor 32. Housed in the vacuum chamber 40 are the stamper 20 with the minute projections 22 formed on its underside, and the ultraviolet light source 24 connected in a circuit with a power supply 44 via an on-off switch not shown. The fluid-actuated cylinder 26 with the pressure pad 28 is disposed under the upper flight of the conveyor belt 34 carrying the blank web B'.

The operation of this continuous stamping apparatus 30 is essentially a repetition of the optodynamic stamping cycle that has been set forth in connection with FIG. 3, except that a partial vacuum is set up in the vacuum chamber 40 by the vacuum pump 42, either continuously or at least while the blank web B' is being pressed against the stamper 20. This evacuation of the vacuum chamber 40 is intended to assure closer contact between blank web B' and stamper 20. Also, in this apparatus 30, the fluid-actuated cylinder 26 presses part of the blank web B' against the stamper 20 via the conveyor belt 34, which is understood to be sufficiently pliant to permit such pressing of the web against the stamper.

Each time a desired pattern of pits is impressed on the web blank B', the belt conveyor 32 is driven to advance the blank unit distance predetermined by the diameter of each audio disc to be made. Then the same stamping cycle is repeated for the creation of the same pit pattern on the next part of the web blank. Of course, the apparatus 30 lends itself to ready modification for the simultaneous creation of two or more pit patterns on the web blank.

The following is the description of some specific Examples of the present invention, showing how digital audio discs were fabricated by the method of the invention.

EXAMPLE 1

A quartz glass stamper was prepared which had a thickness of five millimeters and a diameter of 200 millimeters and which had a pattern of minute projections formed thereon by etching as a negative of pits representative of digital audio information. This stamper was placed on top of an ultraviolet lamp housing, with the etched surface of the stamper directed away therefrom. The blank in use was a dry polycarbonate sheet with a thickness of 0.1 millimeter. This sheet was placed on the stamper in close contact with its etched surface. Then the polycarbonate sheet was irradiated with ultraviolet light through the stamper, for a length of time specified in Table 1. The intensity of the ultraviolet light was 120 watts per square centimeter.

Then, after separating the polycarbonate sheet from the stamper, an aluminum layer was formed by vapor deposition on the pit-bearing surface of the polycarbonate sheet. Then the polycarbonate sheet with the aluminum layer thereon was bonded to a plastic disc, with a thickness of one millimeter and a diameter of 120 millimeters, by means of a plastic that solidifies on exposure to ultraviolet radiation. Then the resulting structure was cut to the size of a CD.

Several CDs were fabricated through the same procedure as above except for the time of ultraviolet irradiation, which was varied as set forth in Table 1. Then the digital audio information that had been stamped on the thus-fabricated CDs was reproduced in order to evaluate the quantity of the reproduction. The CDs were also studied under an electron microscope for the dimensional accuracy of the pits. The results were as given in Table 1.

TABLE 1

| Irradiation Time (Seconds) | Reproduction | Pit Formation |
|---|---|---|
| 5 | Impossible | Not formed |
| 10 | Impossible | Partly formed |
| 20 | Partly possible | Fully formed |
| 30 | Fully possible | Fully formed |
| 40 | Fully possible | Fully formed |

Table 1 indicates that the irradiation time of ultraviolet light should be at least 30 seconds for the best results.

EXAMPLE 2

The procedure of Example 1 was followed except that the stamper in use was of polyethylene film having a thickness of one millimeter, with the pattern of minute projections formed thereon by the known thermal transfer process. The CDs thus produced were compared with those fabricated by the same method except that the blank was of polyethylene terephthalate. The results of Table 2 clearly demonstrate the advantage of the polycarbonate blank over the polyethylene terephthalate blank.

TABLE 2

| Irradiation Time (Seconds) | Polycarbonate | | Polyethylene Terephthalate | |
|---|---|---|---|---|
| | Reproduction | Pit Formation | Reproduction | Pit Formation |
| 5 | Impossible | Not formed | Impossible | Not formed |
| 10 | Impossible | Partly formed | Impossible | Not formed |
| 20 | Partly possible | Fully formed | Impossible | Not formed |
| 30 | Fully possible | Fully formed | Impossible | Not formed |
| 40 | Fully possible | Fully formed | Impossible | Partly formed |
| 50 | Fully possible | Fully formed | Partly possible | Partly formed |

EXAMPLE 3

The procedure of Example 1 was again followed except that the blank in use was polycarbonate sheet with a thickness of one millimeter. Also, in consideration of the possibility of poor contact between the stamper and the thicker polycarbonate sheet, a comparison was made between the evacuation and nonevacuation of the vacuum chamber constructed substantially as shown in FIG. 5. The evacuation of the vacuum chamber was made by a rotary pump to a pressure of one millitorr. The results were as given in Table 3.

TABLE 3

| Irradiation Time | Evacuated | | Not Evacuated | |
| --- | --- | --- | --- | --- |
| (Seconds) | Reproduction | Pit Formation | Reproduction | Pit Formation |
| 5 | Impossible | Not formed | Impossible | Not formed |
| 10 | Impossible | Not formed | Impossible | Partly formed |
| 20 | Impossible | Partly formed | Partly possible | Partly formed |
| 30 | Fully possible | Fully formed | Fully possible | Fully formed |

Although the invention has been shown and described hereinbefore as adapted for the fabrication of digital audio discs, it is understood that the invention is applicable to the manufacture of a variety of other types of optical record media within the broad teaching hereof. Modifications and alterations are also possible in the details of the foregoing disclosure without departing from the scope of the invention. For example, the stamper could have a multiplicity of depressions, instead of projections, for creating corresponding projections in the plastic blank, all that is required being that optically detectable marks be formed in the blank in a manner capable of representing information to be reproduced.

We claim:

1. A method of fabricating an optical record medium such as a digital audio disc having a multiplicity of optically detectable marks such as depressions or projections formed thereon in a prescribed pattern representative of information to be reproduced, comprising:
    providing a stamper having a stamping surface on which a multiplicity of marks are formed as a negative of the optically detectable marks to be created in the record medium, the stamper being fabricated from a material that is transparent to ultraviolet radiation;
    providing a sheet of a plastic that absorbs ultraviolet radiation;
    holding said plastic sheet against said stamping surface of said stamper under pressure; and
    irradiating said plastic sheet through said stamper with ultraviolet radiation to cause the surface of said plastic sheet being held against said stamping surface of said stamper to soften and the negative marks on said stamping surface to be embossed on said surface of said plastic sheet as the optically detectable marks.

2. The method as claimed in claim 1 and further comprising:
    discontinuing said ultraviolet radiation;
    cooling said surface of said plastic sheet held against said stamping surface; and
    separating said plastic sheet from said stamper.

3. The method as claimed in claim 1 and further comprising:
    applying a partial vacuum as said plastic sheet is held against said stamping surface of said stamper to assure close contact therebetween.

4. The method as claimed in claim 3 and further comprising:
    discontinuing said ultraviolet radiation;
    cooling said surface of said plastic sheet held against said stamping surface; and
    separating said plastic sheet from said stamper.

5. An apparatus for the quantity production of optical record media, such as digital audio discs, each having a multiplicity of optically detectable marks such as depressions or projections formed thereon in a prescribed pattern representative of information to be reproduced, the apparatus comprising:
    a stamper having a stamping surface and a multiplicity of marks on said stamping surface formed as a negative of the optically detectable marks to be impressed in the record medium, the stamper being fabricated from a material that is transparent to ultraviolet radiation;
    a conveyor for transporting a continuous web of optical record medium material in proximity to said stamping surface;
    pressing means in spaced relation to said stamping surface for pressing a part of a web of optical record medium material on the conveyor between said stamping surface and said pressing means against said stamping surface, said stamper and pressing means being relatively movable; and
    a source of ultraviolet radiation positioned relatively to said stamper for irradiating the space between said stamping surface and said pressing means through said stamper;
    so that the surface of a web of optical record medium material held against said stamping surface gels due to irradiation by said source of ultraviolet radiation, and said negative marks on said stamping surface are accurately transferred thereto as the optically detectable marks.

6. The apparatus as claimed in claim 5 and further comprising:
    means defining a vacuum chamber accommodating at least said stamper; and
    means for evacuating said vacuum chamber at least when the web of optical record medium material is pressed against said stamper surface by relative movement of said pressing means and stamper.

* * * * *